United States Patent [19]

Stiles

[11] Patent Number: 5,402,150
[45] Date of Patent: Mar. 28, 1995

[54] POINTING DEVICE WITH IMPROVED PIVOT

[75] Inventor: William P. Stiles, Bothell, Wash.

[73] Assignee: Stratos Product Development Group, Inc., Seattle, Wash.

[21] Appl. No.: 83,044

[22] Filed: Jun. 24, 1993

[51] Int. Cl.[6] .............................................. G09G 3/02
[52] U.S. Cl. ................................... 345/168; 345/156; 345/167
[58] Field of Search ..................... 340/710; 403/97, 93; 16/356, 329, 328; 248/923, 918, 920, 921, 922; 400/682; 345/163, 167, 168, 161, 156, 157

[56] References Cited

U.S. PATENT DOCUMENTS

| | | | |
|---|---|---|---|
| 4,349,942 | 9/1982 | Roy | 16/356 |
| 4,693,444 | 9/1987 | Williams et al. | 248/923 |
| 4,913,387 | 4/1990 | Tice . | |
| 4,917,343 | 4/1990 | Wainscott | 403/97 |
| 4,980,676 | 12/1990 | Nomura et al. | 400/682 |
| 5,102,084 | 4/1992 | Park | 248/918 |
| 5,173,993 | 12/1992 | Baker | 16/329 |
| 5,187,468 | 2/1993 | Garthwaite et al. . | |
| 5,187,746 | 2/1993 | Garthwaite et al. | 345/167 |

OTHER PUBLICATIONS

"IconTroller ™ Keyboard Mounted Joystick", packaging advertisement Suncom.

Primary Examiner—Alvin E. Oberley
Assistant Examiner—Vivian W. Chang
Attorney, Agent, or Firm—Seed and Berry

[57] ABSTRACT

A pivotable trackball-type computer command pointing device for entering commands into a computer has a housing and a ball retained within the housing for generating electrical signals translatable into commands for the computer. A coupling assembly removably attaches to the computer, preferably the keyboard. A knuckle joint assembly pivotally connects the housing to the coupling assembly and includes a pivot blade pivotally received in an elongated recess of a hinge pocket plate to define an axis of rotation within the housing about which the housing is rotatable. Opposing button members each carry actuation teeth which engage a corresponding row of teeth formed in a coupling frame held stationary with respect to the computer by the coupling assembly. When the button members are moved together, the actuation teeth disengage the rows of teeth to permit the housing to be selectively angularly oriented by the user. Alternatively, pawls and corresponding ratchet teeth are used to provide unidirectional orientation of the housing upon depressing one of the two button members. In another alternative embodiment, a brake member having a high coefficient of friction is used to provide a brake to engage the coupling frame. Cams selectively force the brake member against an underside of the coupling frame to lock the housing into a selected angular orientation.

41 Claims, 14 Drawing Sheets

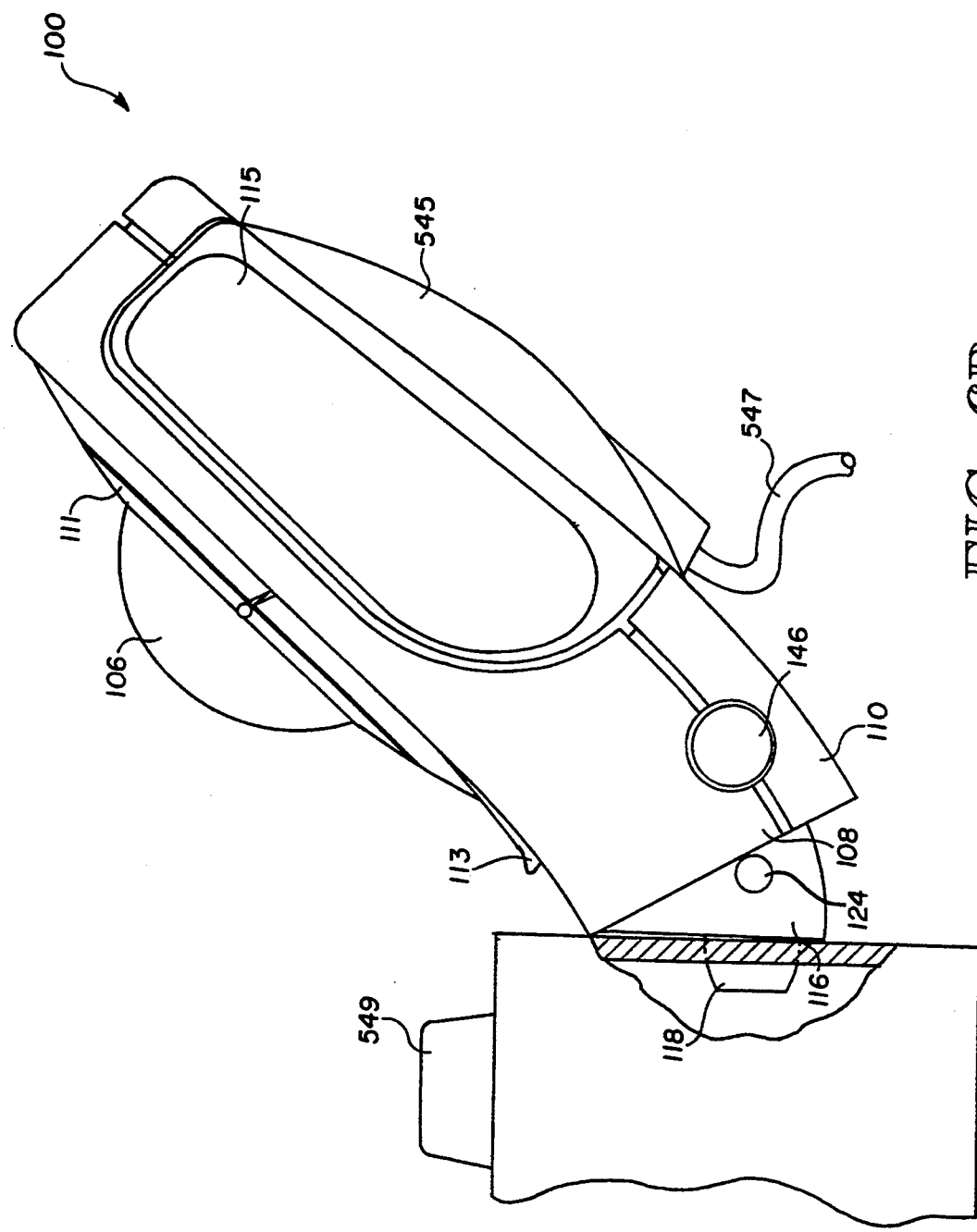

POINTING DEVICE WITH IMPROVED PIVOT

TECHNICAL FIELD

This invention relates to pointing devices for entering commands into a computer. More particularly, this invention is related to a trackball that is pivotably attachable to a keyboard, or a laptop, portable or desktop computer.

BACKGROUND OF THE INVENTION

Pointing devices for entering commands into a computer are well known in the art, and include mice, joysticks, X-Y tablets, wire pens and trackballs. Trackball-type pointing devices include a housing supporting a rotatable ball and one or more depressible buttons. Electronic encoders sense rotation of the ball and generate a signal indicative of the ball's rotation to control movement of a cursor on a display screen of the computer. The ball protrudes from the top of the housing. The housing is usually positioned on a table top. The rotatable ball is exposed for rotation by the hand of a user. The housing may include one or more depressible buttons to enter commands into the computer, based on the position of the cursor on the display screen. Depressing the button permits the user to enter various commands into the computer, based on the location of the cursor. Examples of such commands include: depressing the button to pull down a menu; create starting, ending or other points in a graphic pattern on the screen; moving objects to different locations on the screen; and the like.

Many prior art trackball-type pointing devices are not easily usable with laptop or portable computers. The trackball-type pointing device requires a work surface upon which the housing containing the ball must rest. Many times, a laptop or portable computer is used in an environment where an adequately sized table top or a table top itself is not provided. For example, laptop or portable computers may be used on an airplane tray table, or while resting in a user's lap. In each of these examples, no surface is readily available to a user upon which to place a trackball-type pointing device.

U.S. Pat. No. 5,187,468 describes a trackball-type pointing device attachable to a keyboard using an adjustable clamp. This pointing device permits its use in environments that lack a suitable work surface.

However, even users of larger sized computers and other systems where an appropriate work surface is available find it desirable to use this type of trackball-type pointing device.

In U.S. Pat. No. 5,187,468, a tilting mechanism allows the pointing device to tilt about an axis parallel to an edge of the keyboard. Using the tilting mechanism to tilt the device causes the device to swing through an arc. As a result, the elevational position of the ball and the housing supporting it changes significantly as the device is tilted. Further, the prior art pointing device projects a significant distance to the side of the keyboard to which it is attached and positions the ball far from the keyboard. Because of this movement and the size and location of the ball, more free space is needed in the area adjacent to the keyboard than is sometimes available.

Additional disadvantages of prior trackball-type pointing devices include their use of a large number of components to provide all of the above functions, particularly, attachment to a keyboard and the ability to be tilted.

Therefore, to overcome the above problems, there is a need for an improved pointing device removably attachable to a keyboard or computer that is capable of pivoting about an axis of rotation closer to the keyboard or computer to which it is attached. The pointing device should have a more compact, space-saving design. Also, since fewer components generally result in decreased manufacturing costs, there is a need for a pointing device removably attachable to a keyboard or computer that is capable of tilting which uses fewer components.

SUMMARY OF THE INVENTION

The present invention solves these and other problems of the prior art by using, in part, an improved pivot assembly. The present invention is directed to computer command apparatus for entering commands into a computer resting on a work surface. The computer command apparatus includes a housing and an input device supported by the housing and including a rotatable ball and encoding members adapted to generate electrical signals translatable into commands to the computer. The computer command apparatus of the present invention further includes a coupling member selectively, mechanically attachable to and detachable from the computer and a pivot assembly, pivotally coupling the housing and the coupling member together for selected pivoting movement of the housing relative to the coupling member.

The pivot assembly includes a first hinge member positioned within the housing and attached to the coupling member, and a second hinge member positioned within the housing and attached to the housing. The second hinge member is rotatable relative to the first hinge member about an axis of rotation located within the housing to selectively move the housing between a plurality of possible user-selected angular orientations of the housing relative to the coupling member. The first hinge member of the pivot assembly has an engagement edge and the second hinge member has an elongated, receiving recess, the engagement edge of the first hinge member being pivotally received within the receiving recess of the second hinge member. The second hinge member extends over and rests upon the first hinge member, and the first hinge member supports a substantial portion of the weight of the housing through the second hinge member.

Furthermore, the computer command apparatus of the present invention includes a selectively operable locking member selectively operable by a user to lock the housing in an angular orientation relative to the coupling member selected by the user from a plurality of possible angular orientations, and to unlock the housing and allow adjusting angular movement of the housing by the user. This selectively operable locking arrangement allows for at least three ways of adjusting the angular movement of the housing by the user. First, the locking member includes an engagement member and the coupling member includes a receiver, such as interlocking teeth. The engagement member is movable into and out of locking engagement with the receiver to selectively lock and unlock, respectively, the housing against pivotal movement relative to the coupling member. Second, the locking member includes a friction brake movable into and out of frictional engagement with the coupling member to selectively lock and unlock, respectively, the housing against pivotal movement. Third, the locking member includes first and second pawls and the coupling member include first and second sets of ratchet teeth. The first pawl is engageable with the first set of ratchet teeth to permit adjusting angular movement of the housing in a first direction and prevent adjusting angular movement of the housing in a second direction opposite to the first direction. The second pawl is engageable with the second set of ratchet teeth to permit adjusting angular movement of the housing in the second direction and prevent adjusting angular movement of the housing in the first direction. The first and second pawls are selectively movable into and out of operable engagement with the first and second sets of ratchet teeth, respectively.

Other features and associated advantages of the present invention will become apparent from studying the following detailed description of the presently preferred exemplary embodiments, together with the following drawings.

BRIEF DESCRIPTION OF THE DRAWINGS

FIG. 6B is a right side elevational view of the pointing device of FIG. 5A shown tilted at 30°.

DETAILED DESCRIPTION OF A PRESENTLY PREFERRED EXEMPLARY EMBODIMENT

Figure 1A:
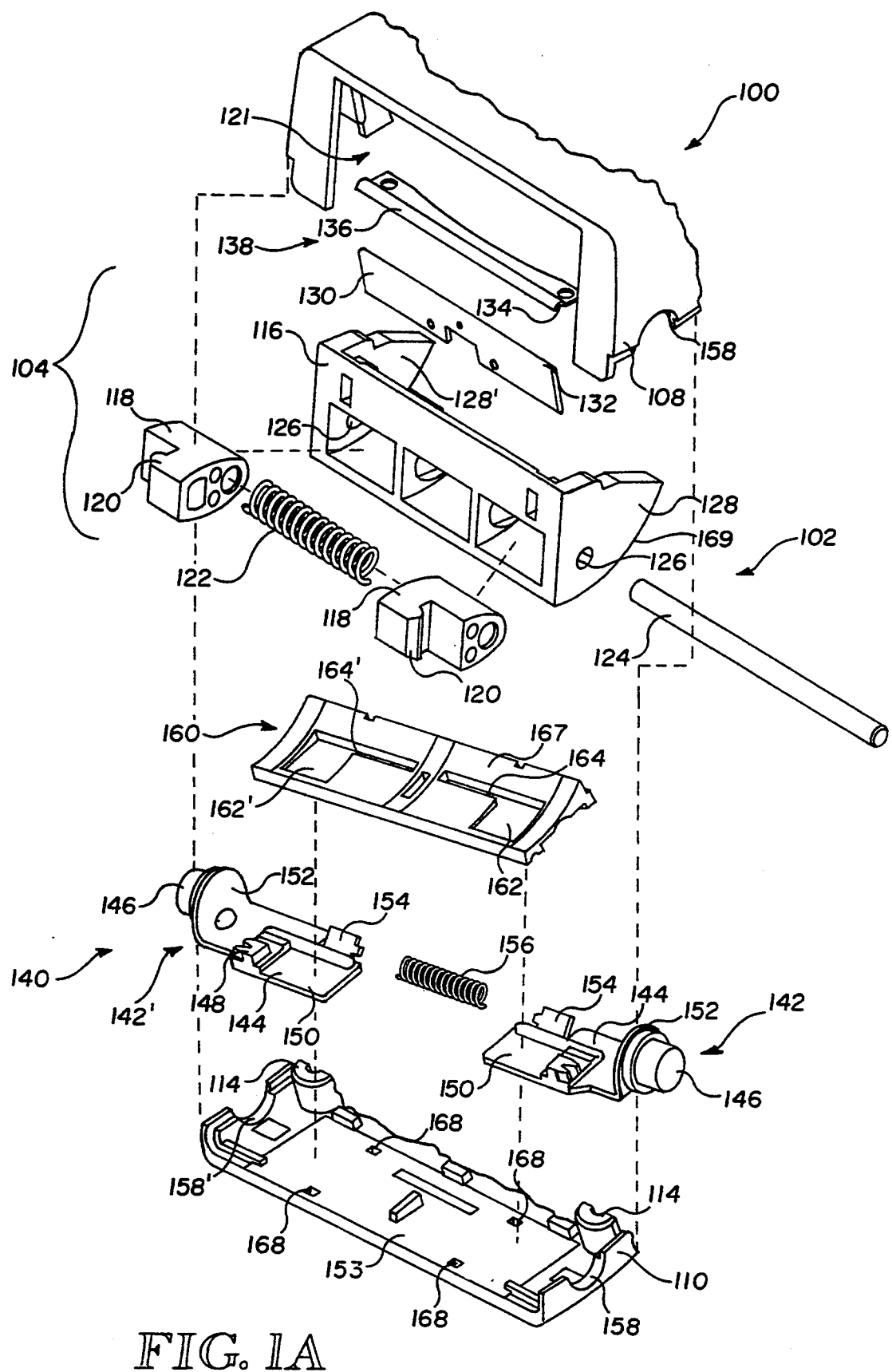
FIG. 1A is an exploded isometric front view of a first embodiment of a pointing device of the present invention.
Figure 1B:
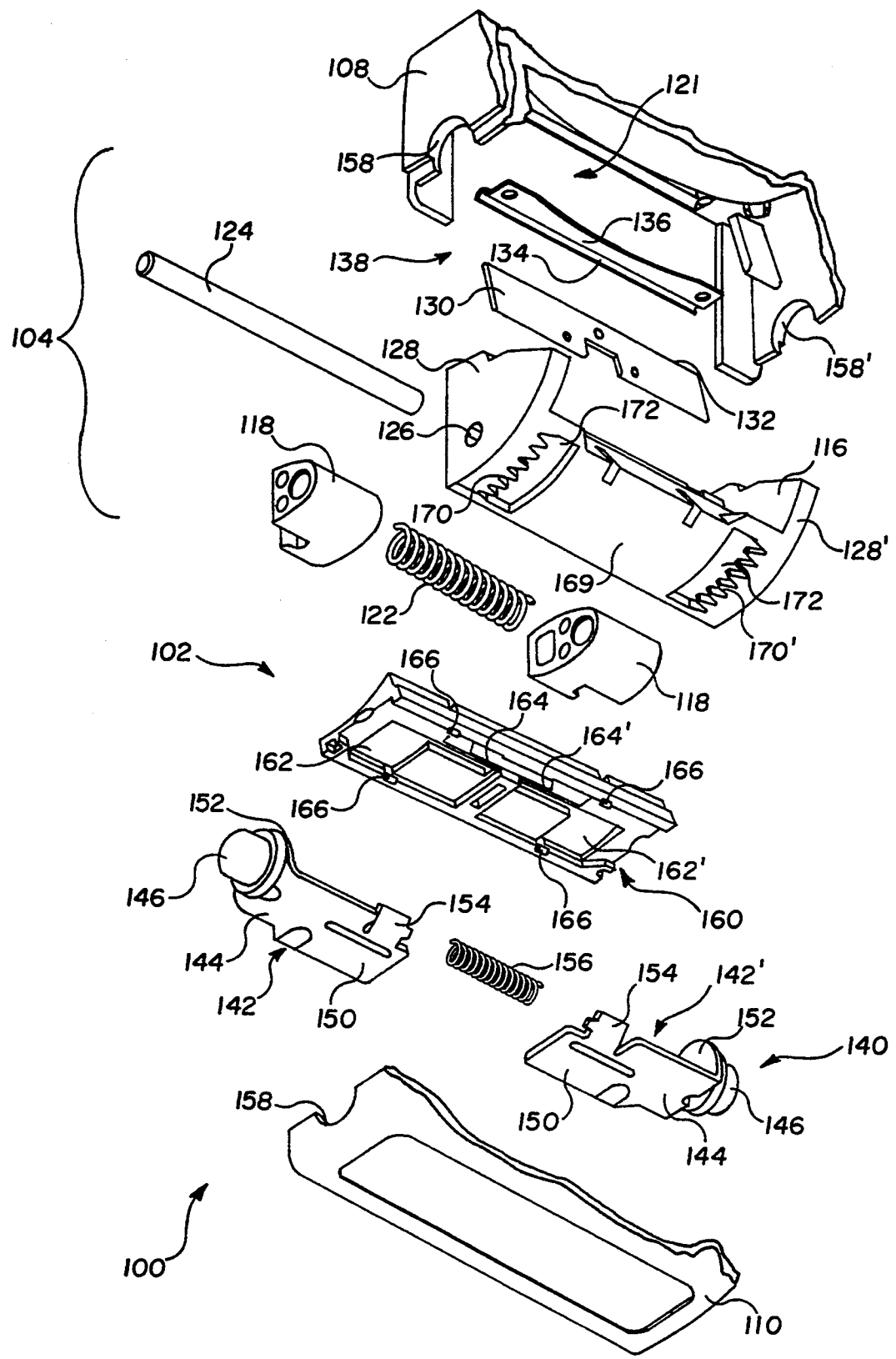
FIG. 1B is an exploded isometric rear view of the first embodiment of FIG. 1A.

FIGS. 1A and 1B show a trackball-type pointing device 100 according to the present invention. The pointing device 100 includes a housing 102 with a coupling assembly 104. As shown in FIGS. 5A, 5B, 6A and 6B, the housing 102 supports a ball 106 and associated circuitry to provide input signals to a computer (shown in FIG. 6B). Although a trackball is described below, the present invention may be used with any input device or other peripheral device usable with a computer. The coupling assembly 104 is selectably attachable to, and detachable from, the computer. The computer, to which the coupling assembly is attached, supports the entire weight of the pointing device 100 when it is attached thereto. The housing 102 is pivotably coupled to the coupling assembly 104 for rotation or tilting relative to the coupling assembly and hence, relative to the computer.

Although the pointing device 100 of the present invention is described as attachable to the computer, the term "computer" as used herein, means any component part of a computer, including, the primary housing, the keyboard, the CRT, or other computer device. Additionally, the pointing device 100 may be attachable to any surface requiring the use of a pointing device. For example, the present invention may be attachable to an automatic teller machine, video game, or other device requiring input from a user. Moreover, although the present invention is shown and described below as being removably attached to a computer, it is contemplated that the present invention may be fixedly attached to a computer.

The housing 102 includes an upper housing 108 and a lower housing 110. The lower housing 110 forms the major bottom surface of the pointing device 100, and the upper housing 108 forms the major upper surface of the pointing device 100. The ball 106 shown in FIGS. 5A-6B extends upwardly and through a ball aperture 112 in the upper surface of the upper housing 108. A retaining ring 111 retains the ball 106 in the housing 102. Input buttons 113 and 115 are provided on the housing 102. The upper housing 108 and the lower housing 110 together form a front surface, left and right side surfaces and a curved rear surface of the housing 102. The upper housing 108 and the lower housing 110 may be joined together by any number of connection means known by those skilled in the art. FIGS. 1A and 1B show, for example, portions of screw apertures 114 to permit appropriate screws to securely join the upper housing 108 with the lower housing 110.

The coupling assembly 104 is located within and at the front of housing 102 and includes a coupling frame 116. Within recesses in the coupling frame 116 are a pair of gripping members 118, respectively. The gripping members 118 preferably have oppositely projecting tabs 120 which permit the coupling assembly 104 to selectably attach to, and detach from, a computer. The tabs 120 project forward and outward through a rectangular aperture 121 defined in the front surface of the housing 102.

A spring 122 biases the gripping members 118 and their tabs 120 away from each other. The tabs 120 are sized to releasably engage corresponding flanges in a computer, preferably positioned within a recess in the side of the computer, such as the computer's keyboard or its housing, shown in FIGS. 5B and 6B. The gripping members 118, and the associated members (including the spring 122 and the tabs 120) may be of any design which permits the pointing device 100 to selectively attach to, and detach from, a computer. As noted above, screws, snap fit or other means may also be used to fixedly attach the coupling frame 116 to the computer when removability is not required. When attached to the computer, the coupling frame 116 is held stationery with respect to the computer. Further details on apparatus for removably coupling a device to a computer are described in U.S. Pat. No. 5,187,468, incorporated herein by reference.

A rod 124 extends laterally through a pair of rod apertures 126 in right and left sidewalls 128 and 128', respectively, of the coupling frame 116. The gripping members 118 are slidably mounted on the rod 124 and the rod extends through the spring 122 to secure the gripping members 118 and the spring 122 within the coupling frame 116.

The coupling frame 116 has a pivot blade or hinge plate 130 fixedly attached thereto by any appropriate means, including glue, screws, etc. The hinge plate 130 has an elongated upper edge portion 132 which is rotatably received within a laterally extending, downward opening recess 134 in a hinge pocket plate 136 fixedly attached by any appropriate means, including glue, screws, etc., to the upper housing 108 and projecting over the hinge plate. The line of contact between the hinge plate 130 and the hinge pocket plate 136 defines a laterally extending axis of rotation about which the housing 102 is pivoted or hinged relative to the coupling assembly 104. The hinge pocket plate 136 is attached to an inside surface of an upper wall of the upper housing 108 so as to position the axis of rotation within the housing 102. Together, the hinge plate 130 and the hinge pocket 115 form a knuckle joint assembly 138. Those skilled in the art recognize, however, that other joints or hinges may be substituted so long as they provide the same pivoting function, e.g., piano hinges. The joint assembly 138 permits the housing 102 to pivot about the hinge plate 130 of the coupling assembly 104. The joint assembly 138 is positioned at the top of the pointing device 100, relative to the work surface.

The coupling frame 116 and the hinge plate 130 may be manufactured together as an integral piece. Likewise, the upper housing 108 and the hinge pocket plate 136 may be manufactured as an integral piece. In the illustrated embodiment of the invention, the hinge plate 130 and the hinge pocket plate 136 of the joint assembly 138 are composed of stainless steel and the housing 102 and the coupling frame 116 are composed of plastic. The hinge plate 130 is a long rectangular plate, securely attached to the top of the coupling frame 116, having its upper edge portion 132 above the top of the coupling frame 116. The hinge pocket plate 136 is a separate steel component securely attached to the underside of the upper housing 108. The joint assembly 138 is made of stainless steel to reduce wear at the hinge point, provide increased strength, and to provide a lower coefficient of friction at the hinge point.

Located within the housing 102 is an actuator assembly 140 which allows selective rotation of the housing relative to the coupling frame 116 of the coupling assembly 104. The actuator assembly 140 includes a pair of opposed right and left pivot button members 142 and 142', respectively. The pivot button members 142 and 142' each include a button plate 144, a pivot button 146, and a locking member 148. The button plate 144 has a substantially flat rectangular portion 150, and a flat semicircular portion 152 extending upwardly from the laterally outward short end of the rectangular portion. The pivot button 146 is mounted on the laterally outward side of the semicircular portion 152. The bottom surface of the rectangular portion 150 is flat and configured to rest on a flat inner surface 153 of the lower housing 110.

The locking member 148 is fixedly attached to and carried atop of the rectangular portion 150 of each of the pivot button members 142 and 142'. A spring tab 154 is fixedly attached at a laterally inward end of the rectangular portion 150. The spring tab 154 extends slightly upward from the rectangular portion 150. The spring tabs 154 of the two-pivot button members 142 and 142' are positioned opposite each other and have a spring 156 inserted therebetween. Each of the spring tabs 154 projects partially into and retains one end of the spring 156. The spring 156 biases the pivot button members 142 and 142' in opposing, laterally outward directions.

The housing 102 has right and left button apertures 158 and 158', respectively, with the pivot button 146 of the corresponding right or left pivot button members 142 or 142' extending therethrough. Preferably, the pivot buttons 146 are positioned near the bottom surface of the lower housing 110. The pivot buttons 146 are positioned opposite to each other to permit a user to single-handedly actuate the pivot buttons by pressing them inwardly, with respect to the housing 102, and toward each other.

A button member guide 160 slidably retains the pivot button members 142 and 142' against the lower housing 110 and guides their movement when the pivot buttons 146 are pressed by the user, and when the spring 156 returns them to their original position. The button member guide 160 has right and left locking apertures 162 and 162' with a corresponding one of the locking members 148 of the pivot button members 142 and 142' projecting upwardly therethrough. The button member guide 160 also has right and left, laterally extending slots 164 and 164' with a corresponding one of the spring tabs 154 of the pivot button members 142 and 142' extending therethrough. The locking member apertures 162 and 162', and the spring tab slots 164 and 164' have a size greater than that needed by the locking members 148 and spring tabs 154 to permit the pivot button members 142 and 142' to move laterally back and forth within the housing 102.

As shown in FIG. 1B, the button member guide 160 includes, on its lower surface, several tabs 166. As shown in FIG. 1A, the lower housing 110 includes several tab recesses 168 designed to receive and snap fit the tabs 166 so as to hold the button member guide 160 in place within the housing 102. The pivot button members 142 and 142' are positioned between the lower surface of the button member guide 160 and the flat inner surfaces 153 of the lower housing 110 when the tabs 166 are positioned within the tab recesses 168. When the pivot button members 142 and 142' are so secured, and the spring 156 in position between the spring tabs 154, this portion may be more easily assembled with the other portions of pointing device 100.

Figure 7A:
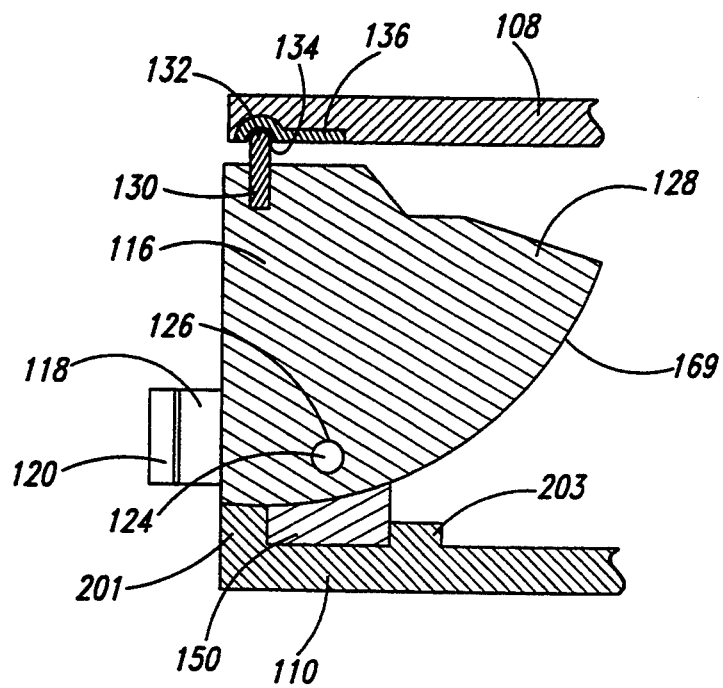
FIG. 7A is a cross-sectional view of the pointing device shown in FIG. 5 A detailing the joint assembly.
Figure 7B:
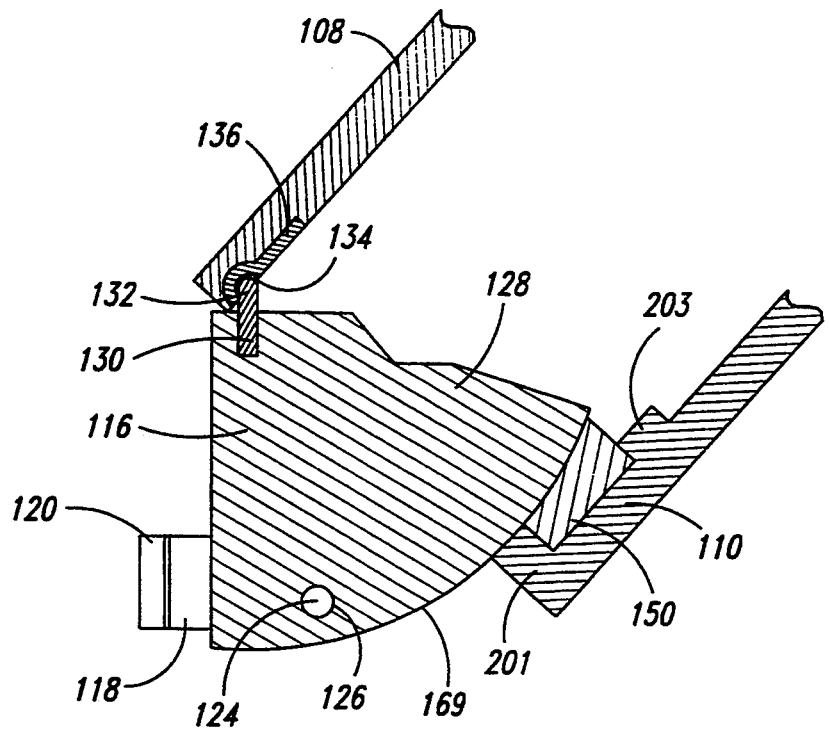
FIG. 7B is a cross-sectional view of the present invention shown in FIG. 6A detailing the pivot assembly.

The button member guide 160 moves with the housing 102 and has a curved upper surface 167 against which a curved lower side 169 of the coupling frame 116 slidably fits. With the arrangement-described, the housing 102 is clamped around the coupling frame 116. Downward movement of the coupling frame relative to the housing is restricted by the lower housing 110 and the button member guide 160, while upward movement of the coupling frame relative to the housing is restricted by the hinge plate 130, hinge pocket plate 136, and upper housing 108. As shown in FIGS. 7A and 7B, this effectively retains the hinge plate 130 and the hinge pocket plate 136 in constant compression as the housing 102 is rotated.

In the preferred embodiment, the button member guide 160 is made of, or coated with, a material selected to reduce friction between itself and the coupling frame 116 as the housing 102 is pivoted about the hinge plate 130 of the coupling assembly 104. For example, TEFLON ® anti-friction coating, manufactured by DuPont Corp., may be used on the upper surface of the button member guide 160, the surface which contacts the coupling frame 116. Those skilled in the art will recognize that the button member guide 160 may be made from, or coated with, any suitable material to reduce friction, and that the choice of material to be used may depend upon the type of material of which the coupling frame 116 is manufactured.

Figure 8A:
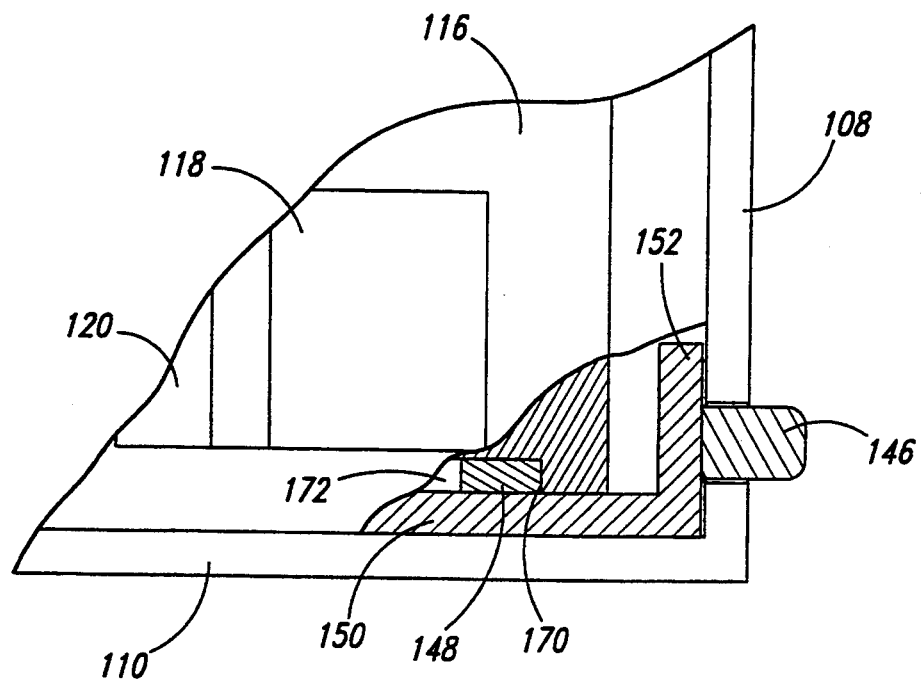
FIG. 8A is a portion of a front view of the present invention, having a cutaway showing the actuator assembly in its locked position.
Figure 8B:
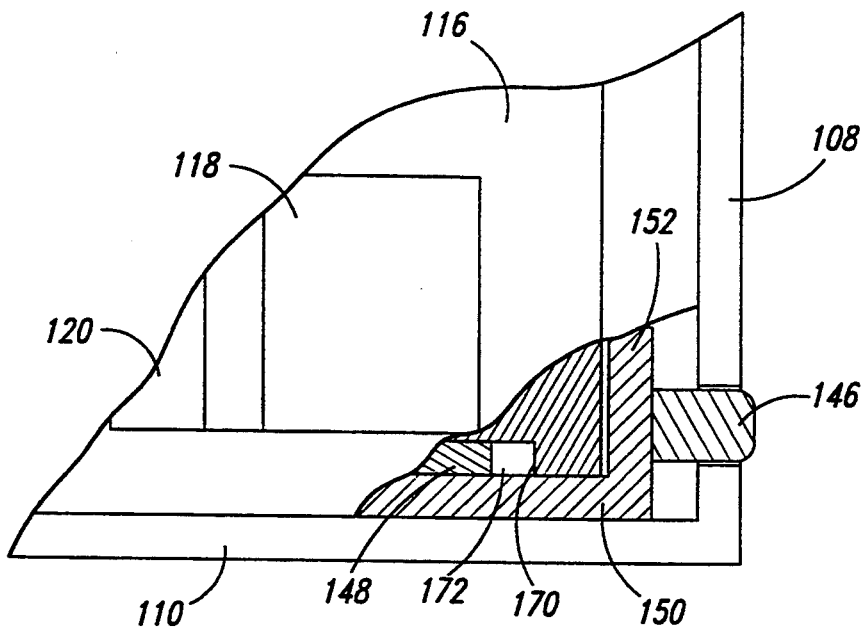
FIG. 8B is a portion of a front view of the pointing device of FIG. 8A showing the actuator assembly in its unlocked position.

The housing 102 is rotatably attached to the coupling assembly 104 by the joint assembly 138 (i.e., the hinge plate 130 and the hinge pocket plate 136) for rotation about the axis of rotation defined by the hinge plate 130 and the hinge pocket plate 136. As shown in FIGS. 7A and 7B, the axis of rotation, and thus joint assembly 138, is preferably located at the upper, forward edge of the upper housing 108 (proximate to, e.g., the computer keyboard) to which the pointing device 100 is attached, but inside the housing 102. The locking members 148 selectively engage and interlock with corresponding portions of right and leer fixing members 170 and 170', respectively, each formed in a recess 172 in the underside of the coupling frame 116, as shown in FIG. 1B. In one preferred embodiment, the fixing members 170 and 170' each comprise a row of teeth and each locking member 148 comprises a pair of teeth which mesh with the teeth of the fixing members 170 and 170'. FIGS. 8A and 8B show the locking member 148 both engaged, and disengaged with the fixing member 170, respectively.

The user can change the angular orientation of the housing 102 of the pointing device 100, while it is rigidly attached to the computer, by rotating the housing about the hinge plate 130 and hinge pocket plate 136 axis of rotation. This is accomplished by simultaneously depressing both of the pivot buttons 146 of the actuator assembly 140 inwardly, which causes the pivot button members 142 and 142' to move inwardly relative to the housing 102, and toward each other. This causes the spring 156 to compress and the teeth of the locking members 148 of the pivot button members 142 and 142' to disengage from the rows of teeth of the fixing members 170 and 170', as shown in FIG. 8B. With the locking members 148 so disengaged, the housing 102 can be freely rotated or tilted to the angular orientation desired and then the pivot buttons 146 released. Of course, the extent of angular movement of the housing 102 possible is limited by the curvature of surface 169 and the length of the rows of teeth comprising the fixing members 170 and 170'.

The spring 156 applies a laterally outward force on the pivot button members 142 and 142' to move the teeth of the locking members 148 back into engagement with the rows of teeth of the fixing members 170 and 170' when the buttons 146 are released. The spring 156 retains the pivot button members 142 and 142' in position with the locking members 148 interlocking with the fixing members 170 and 170', as shown in FIG. 8A, until the user again depresses the pivot buttons 146 to change the angular orientation of the housing 102. Once the locking members and fixing members reengage, the housing 102 is held fixed in its new angular orientation.

The combination of the concave shape of the upper surface of the button member guide 160 and the complimentary convex shape of the lower side 169 of the coupling frame 116 permits the teeth of the locking members 148 to always mesh with the teeth of the fixing members 170 and 170' at any permitted angular orientation of the housing 102.

The pivot buttons 146 are arranged along a line extending therebetween which is parallel to the axis of rotation. This line is preferably at a distance of 0.7 cm to 1.5 cm from the axis of rotation of the joint assembly 138. This distance provides a slight mechanical lever arm to permit the user to easily pivot the housing 102 about the axis of rotation by applying a force through his fingers engaging the pivot button. This distance could be increased, however, this would unnecessarily increase the size of the pointing device 100.

The housing 102 can be rotated to selected angular positions, ranging, for example, between one that is substantially horizontal with the work surface and one that is approximately 60° from the work surface. The housing 102 can freely rotate up or down until the locking members 148 abut one of the end walls of the recess 172 in which the fixing members 170 and 170' are formed, or until its range of motion is limited by the computer to which it is attached.

The number of possible locking angular positions depends upon the size and number of teeth used for the locking members 148 and the fixing members 170 and 170'. The locking members 148 each preferably has two teeth and the fixing members 170 and 170' each preferably has seven grooves formed by its teeth. Therefore, the housing 102 may pivot and lock in six discrete positions. If only one tooth was used for each of the locking members 148, seven discrete positions would be available; however, the housing 102 would be held in place at each end by only one tooth, which might not be sufficiently strong to resist the normal forces applied to the housing during use, and the tooth might break. Three or more teeth used for each locking member 148 would be even stronger than two, however, fewer discrete positions would be available to the user.

Figure 5A:
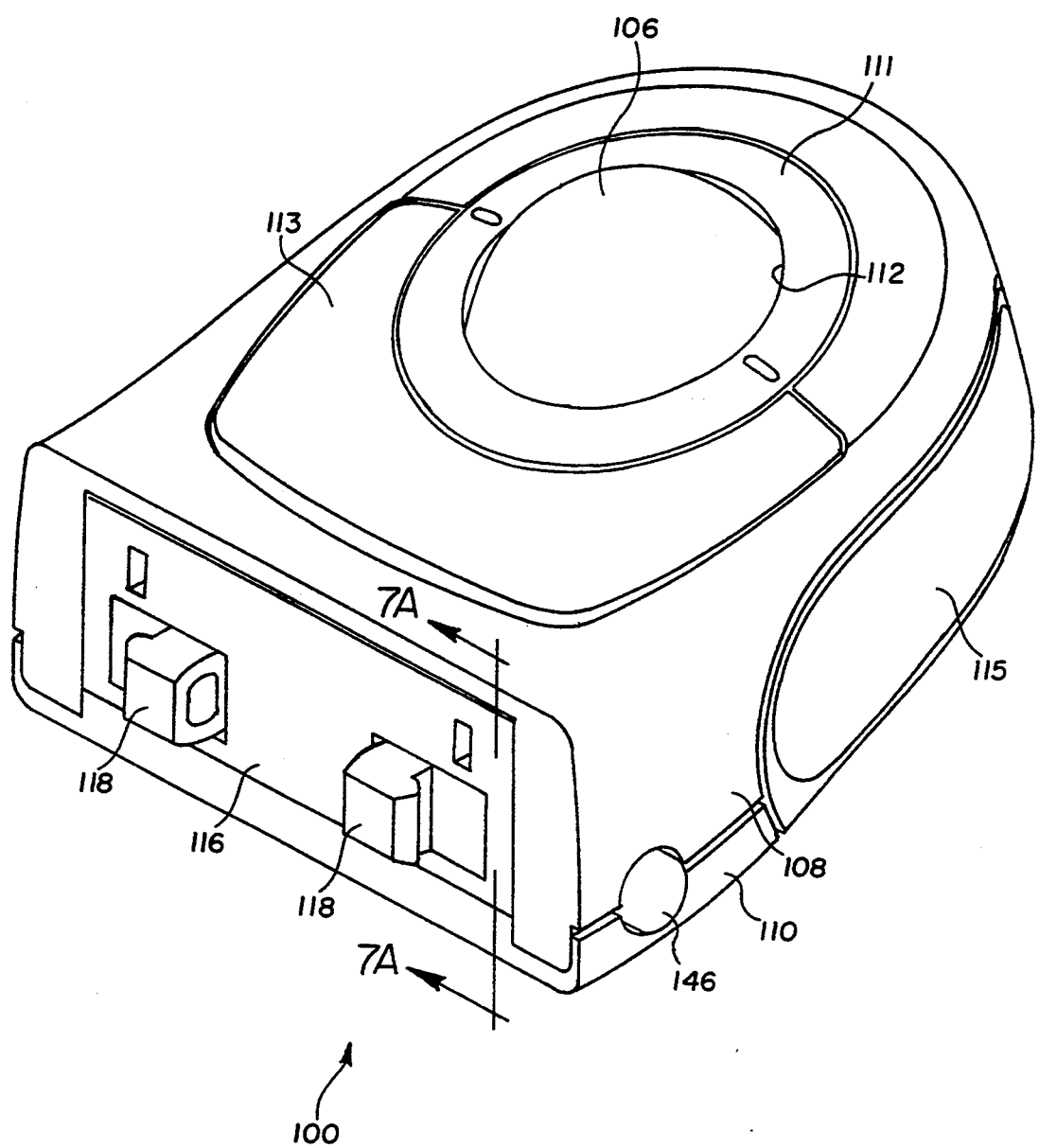
FIG. 5A is an isometric view of the pointing device of the present invention shown tilted at 0°.
Figure 5B:
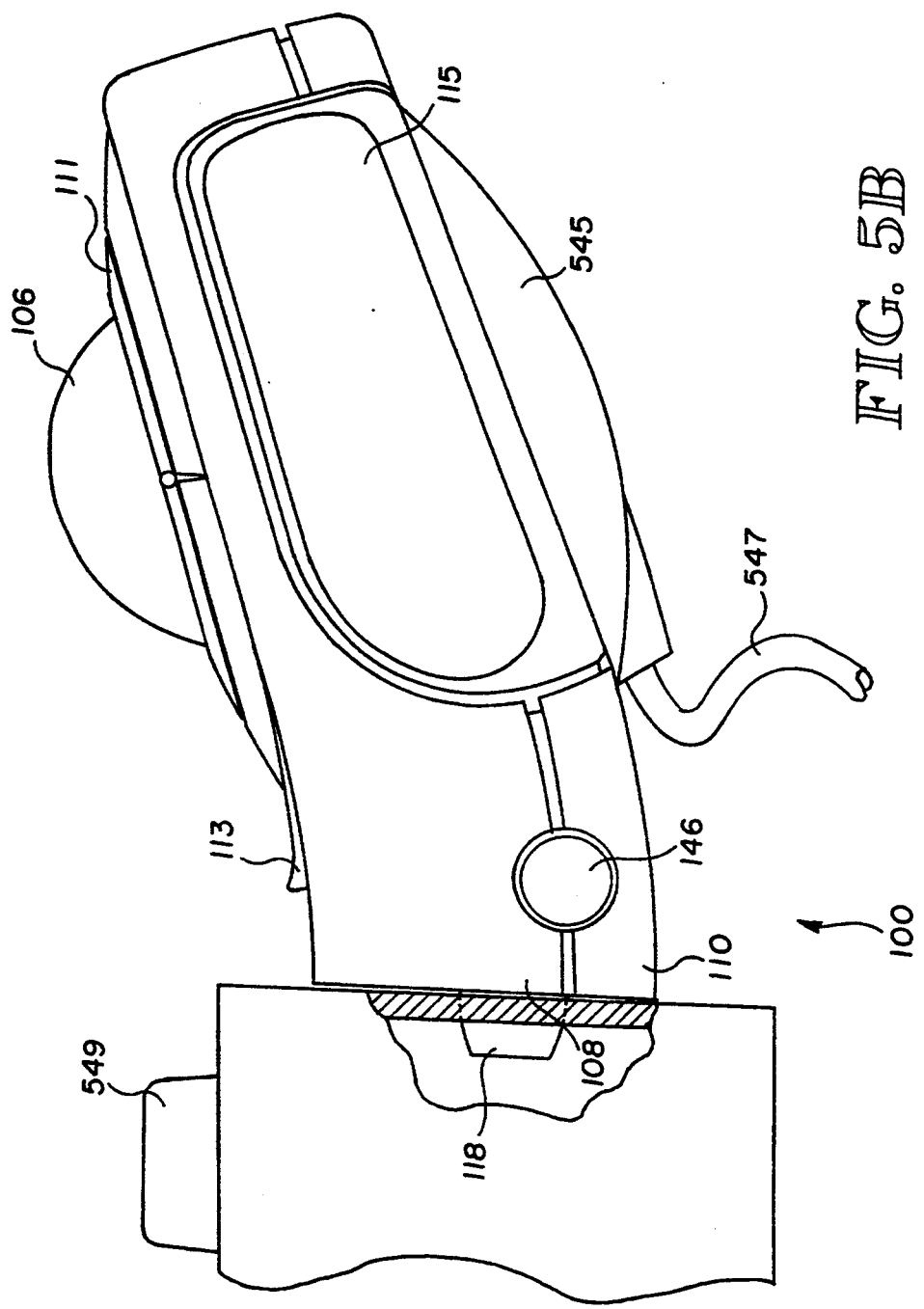
FIG. 5B is a right side elevational view of the pointing device of FIG. 5A shown tilted at 0°.
Figure 6A:
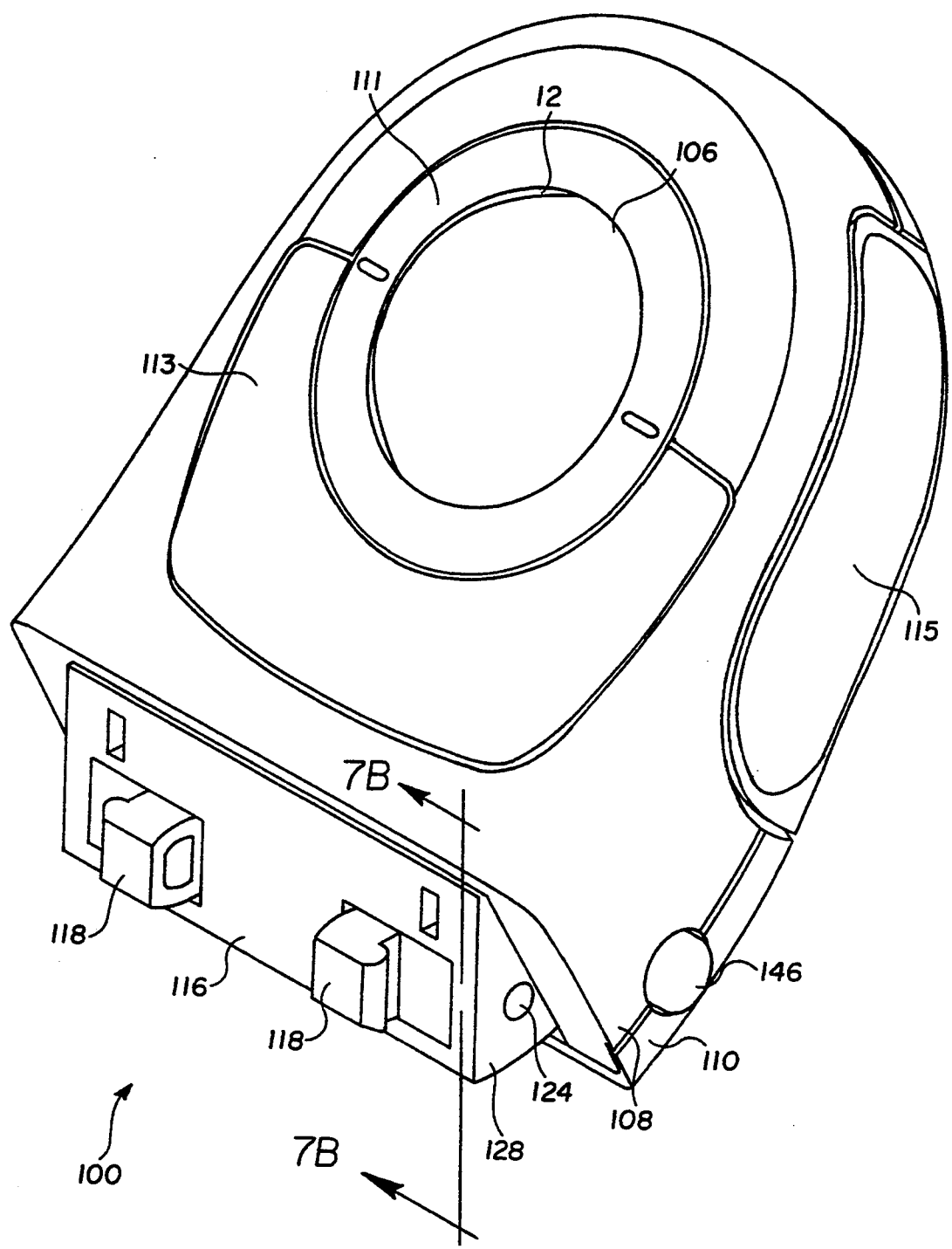
FIG. 6A is an isometric view of the pointing device of FIG. 5A shown tilted at 30°.

In the preferred embodiment, the housing 102 has a total range of motion of 30°. Since six discrete positions are available, the housing 102 may be pivoted and retained in 5° intervals. FIG. 5A and 5B show the housing 102 in a 0° tilt position; while FIGS. 6A and 6B show the housing 102 in the fully pivoted 30° position.

Figure 2A:
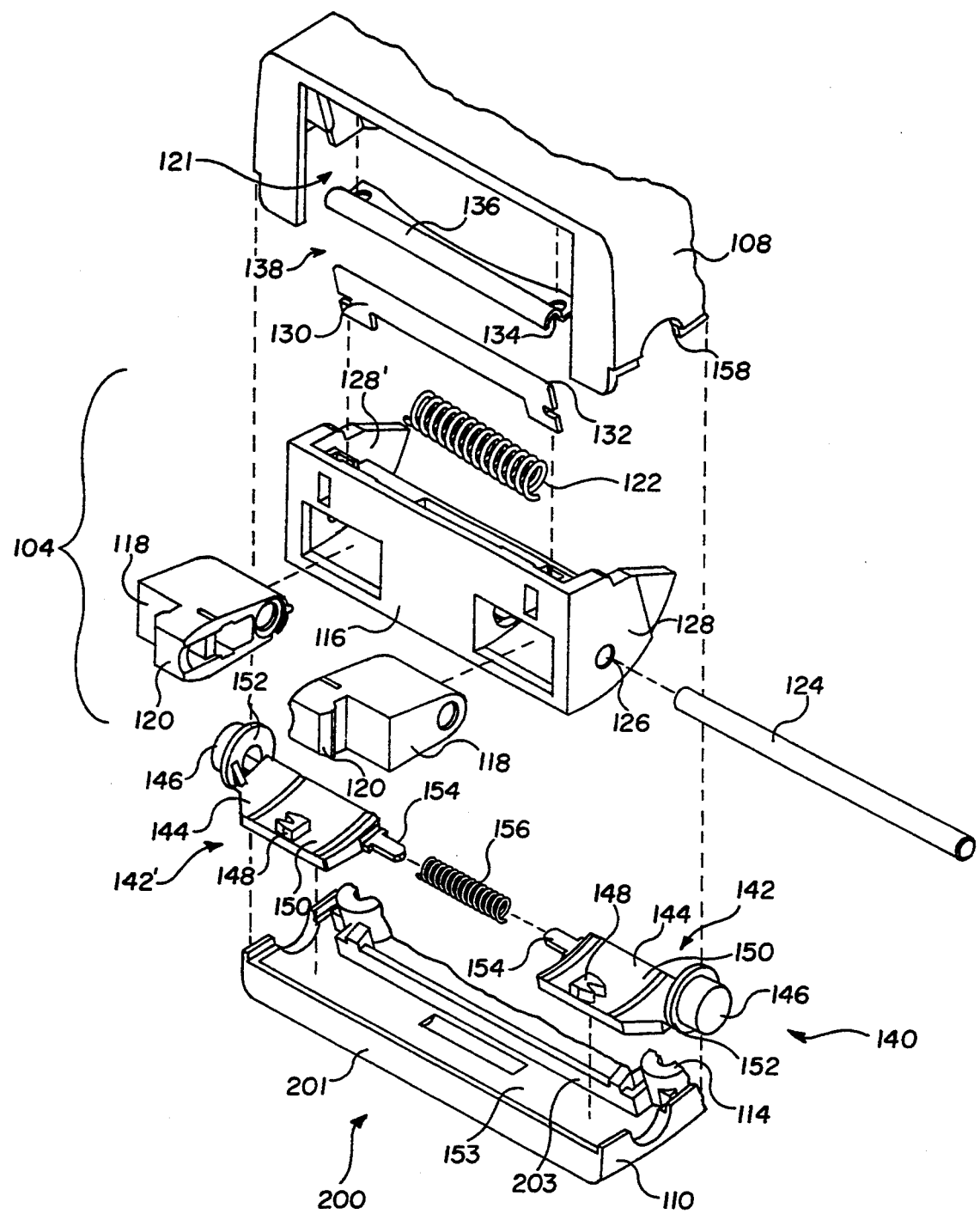
FIG. 2A is an exploded isometric front view of a first alternative embodiment of the present invention which eliminates the need for one component.
Figure 2B:
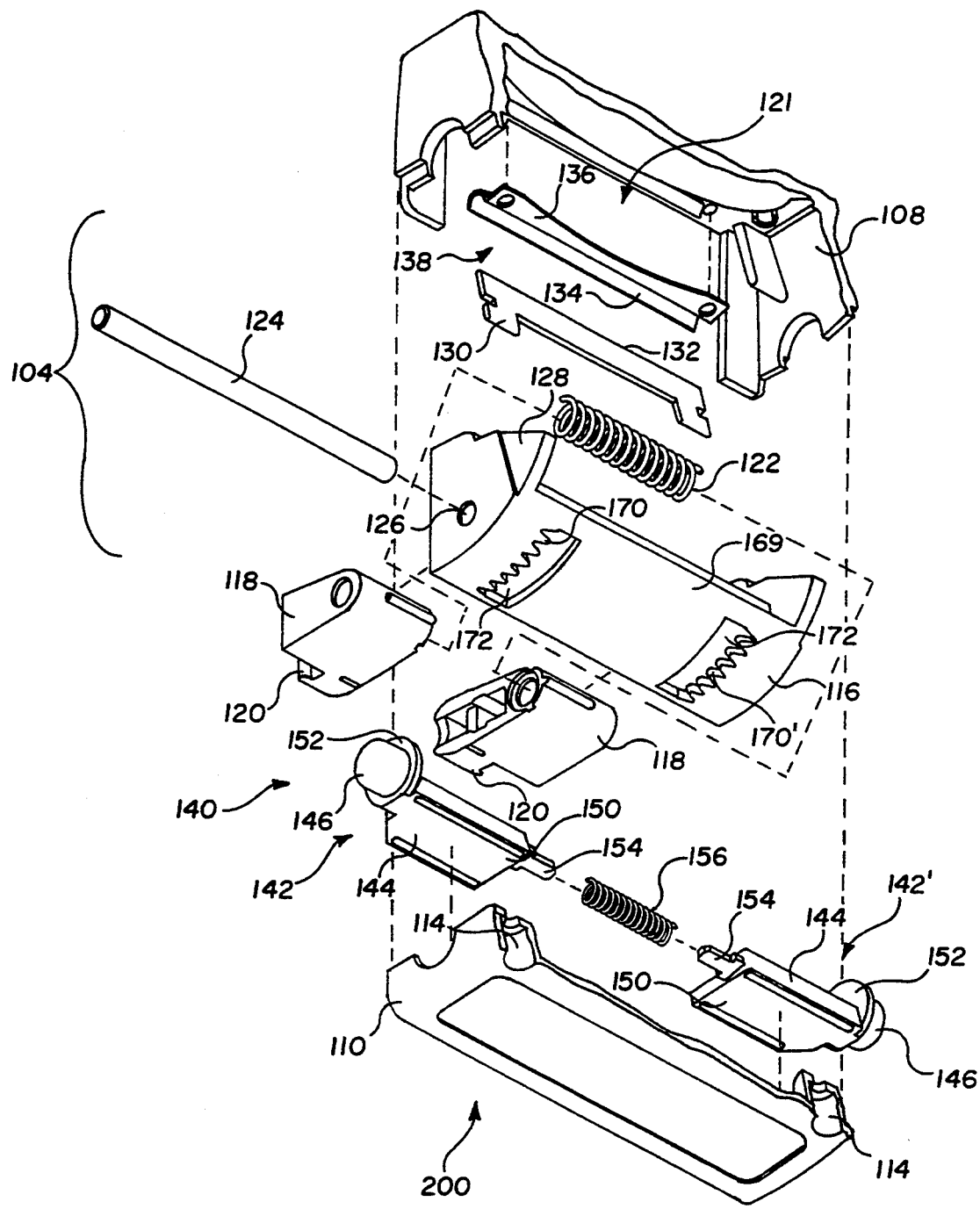
FIG. 2B is an exploded isometric rear view of the first alternative embodiment of FIG. 2A.

A first alternative embodiment of the pointing device 200 according to the present invention is shown in FIGS. 2A and 2B. The pointing device 200 is substantially similar to the pointing device 100 shown in FIG. 1A and 2B, and elements in FIGS. 2A and 2B and in the other drawings for other alternative embodiments will be similarly numbered when of similar construction. Only the differences in construction will be described in detail.

A notable difference between the embodiment shown in FIGS. 1A and 1B and the first alternative embodiment of FIGS. 2A and 2B is the elimination of the button member guide 160. The button member guide 160 is unnecessary because in this first alternative embodiment, the lower housing 110 has a raised lip 201 at its front face and a guidebar 203 projecting upwardly from the inner surface 153 of the lower housing and extending parallel to the lip 201. The lip 201 and the guidebars 203 slidably retain the pivot button members 142 and 142' therebetween. The flat front and back sides of the pivot button members 142 and 142' slidably rest between the lip 201 and the guidebar 203, to allow lateral movement in response to depressing the pivot buttons 146 and the return action of the spring 156.

Each pivot button member 142 and 142' include a button plate 144 having a curved upper surface which slidably contacts the curved lower side 169 of the coupling frame 116. The lower surfaces of the pivot button members 142 and 142' are flat to permit these button members to lie in substantially complete contact with the flat inner surface 153 of the lower housing 110.

Figure 3A:
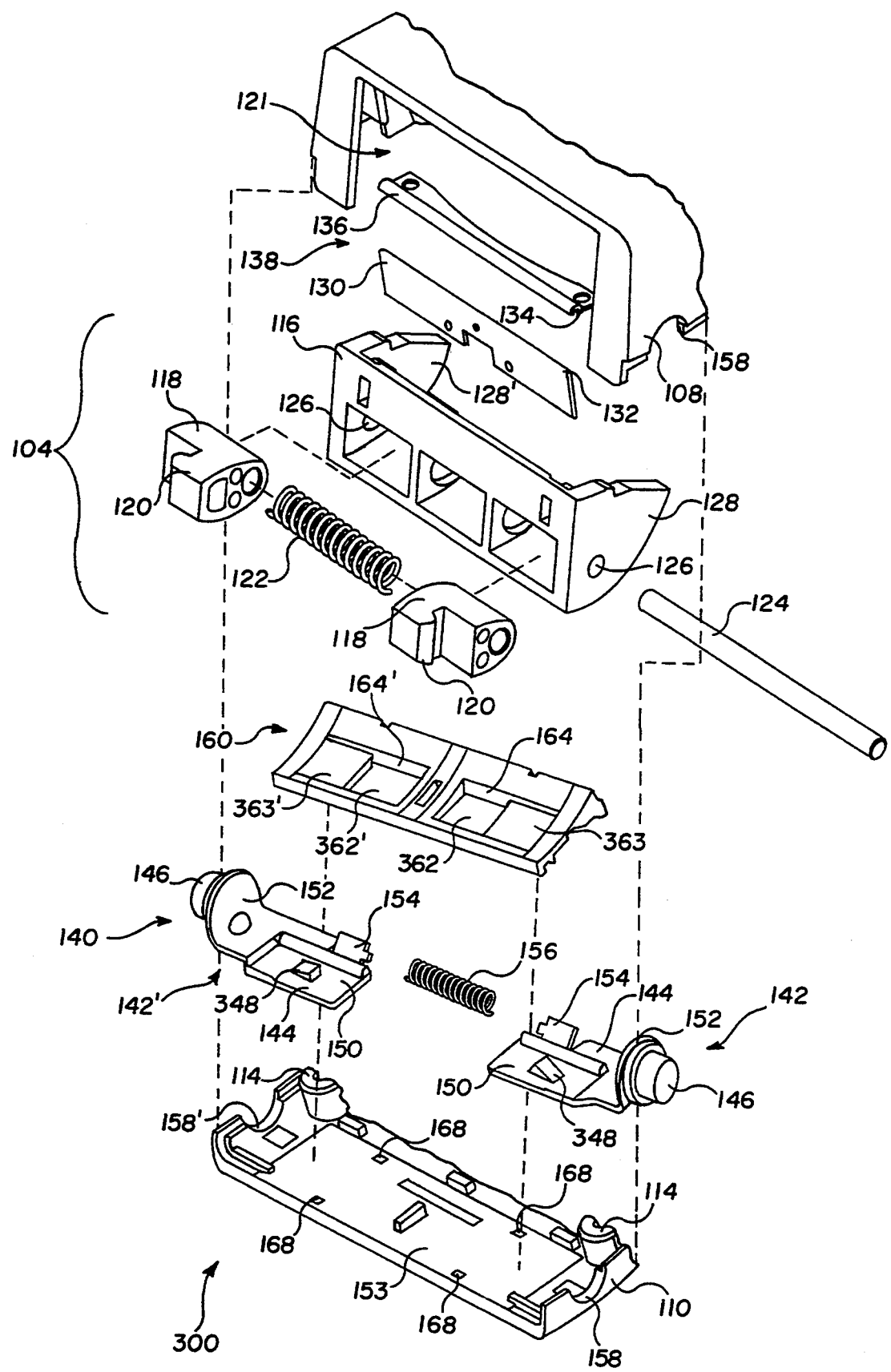
FIG. 3A is an exploded isometric front view of a second alternative embodiment of the present invention using a friction-type locking mechanism.
Figure 3B:
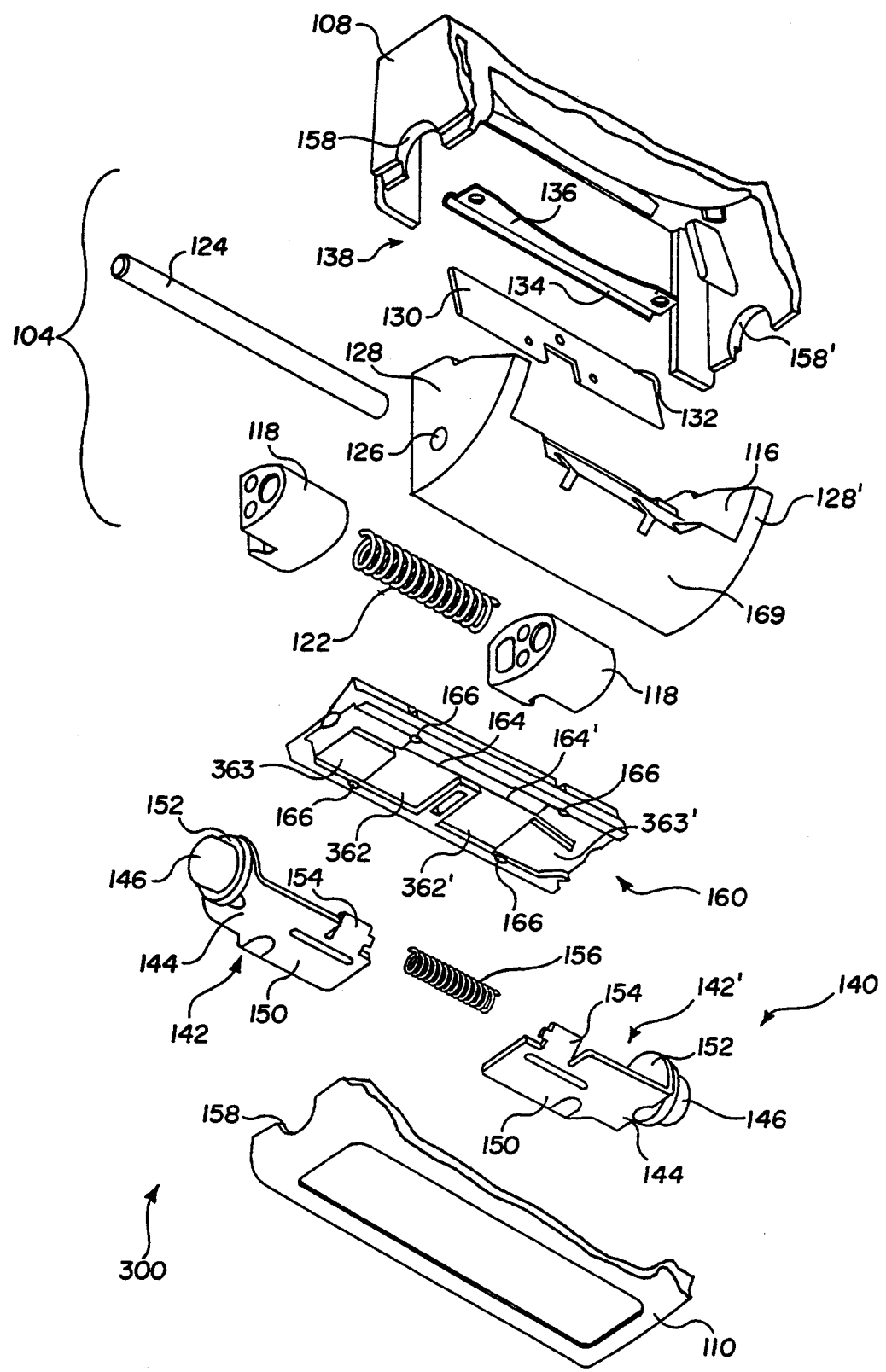
FIG. 3B is an exploded isometric rear view of the second alternative embodiment of FIG. 3A.

Although the two embodiments just described use teeth to selectively lock the housing 102 in six discrete positions, in a second alternative embodiment of the pointing device 300 shown in FIGS. 3A and 3B, the toothed locking members 148 and fixing members 170 and 170' are replaced with a friction brake arrangement. As shown in FIGS. 3A and 3B, a suitable high-friction material covers resilient right and left friction tabs 363 and 363' respectively, carried by the button member guide 160. A laterally outward edge of each of the friction tabs 363 and 363' is pivotally connected to the button member guide 160 for pivotal movement or deflection toward and away from the lower side 169 of the coupling frame 116. Preferably, a friction material known as ENDUR TM, manufactured by Rogers, Inc., of Connecticut, is applied to friction tabs 363 and 363'. Those skilled in the art will recognize, however, that any suitable material with a high coefficient of friction may be used. Alternatively, the button guide 160 could be entirely manufactured of a material having a high coefficient of friction.

The friction tabs 363 and 363' preferable have a generally rectangular shape and bend upwardly when an upward force is applied to their undersides. As shown in FIG. 3A, pivot button members 142 and 142' each have a camming member 348 and 348' attached thereto. The camming members 348 and 348' slope downwardly in the laterally outward direction. When the spring 156 biases the pivot button members 142 and 142' laterally outward, the sloping upper surface of the camming members 348 and 348' force the friction tabs 363 and 363' upward and into frictional engagement with the curved lower side 169 of coupling frame 116. The friction between the friction tabs 363 and 363' and the lower side 169 of the coupling frame 116 is sufficient to lock housing 102 against rotational movement relative to the coupling frame, thus maintaining the angular orientation of the housing, under the normal forces applied to the housing during use of the pointing device 300.

If a user desires to change the orientation of the device 300, the user depresses the pivot buttons 146 inwardly and toward each other. This action moves the camming members 348 and 348' away from engagement with friction tabs 363 and 363' and into apertures 362 and 362' which are formed in the button member guide 160. Since the friction tabs 363 and 363' are no longer forcibly engaged with the lower side of the coupling frame 116 when in the apertures 362 and 362', the housing 102 may be freely pivoted about the rotational axis of the hinge plate 130 and the hinge pocket plate 136. When the desired angular orientation of the housing 102 is reached, the user simply releases the pivot buttons 146, allowing the spring 156 to force the camming members 348 and 348' back underneath the friction tabs 363 and 363', respectively. This, in turn, forces the upper surfaces of friction tabs 363 and 363' upwardly and again into engagement with the lower side 169 of the coupling frame 116. With this arrangement for the pointing device 300 infinite angular adjustment of the housing 102 throughout its entire range of motion may be achieved, and adjustment is not limited to six discrete positions as with the two embodiments previously described.

Figure 4A:
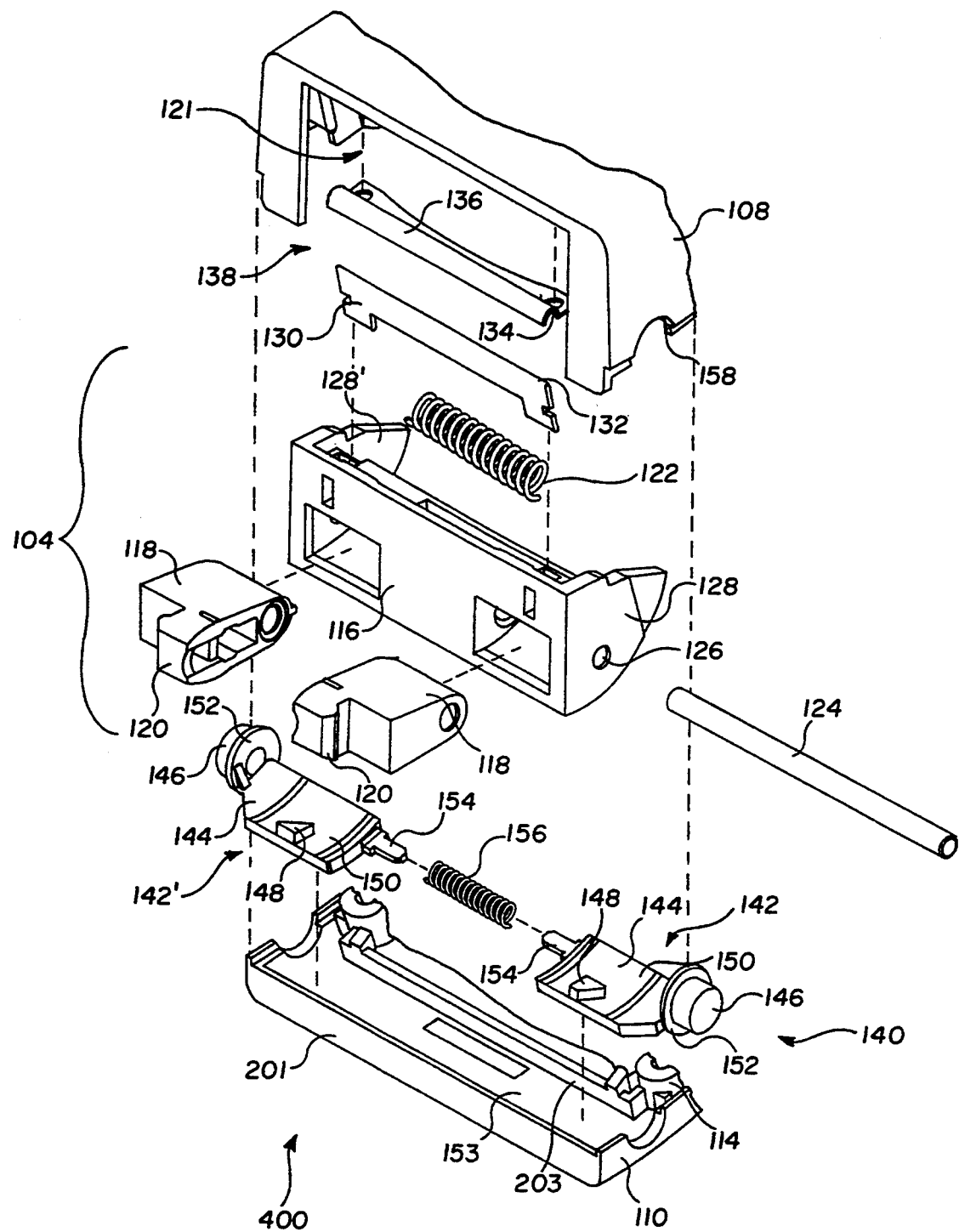
FIG. 4A is an exploded isometric front view of a third alternative embodiment of the present invention using a ratchet and pawl type locking mechanism.
Figure 4B:
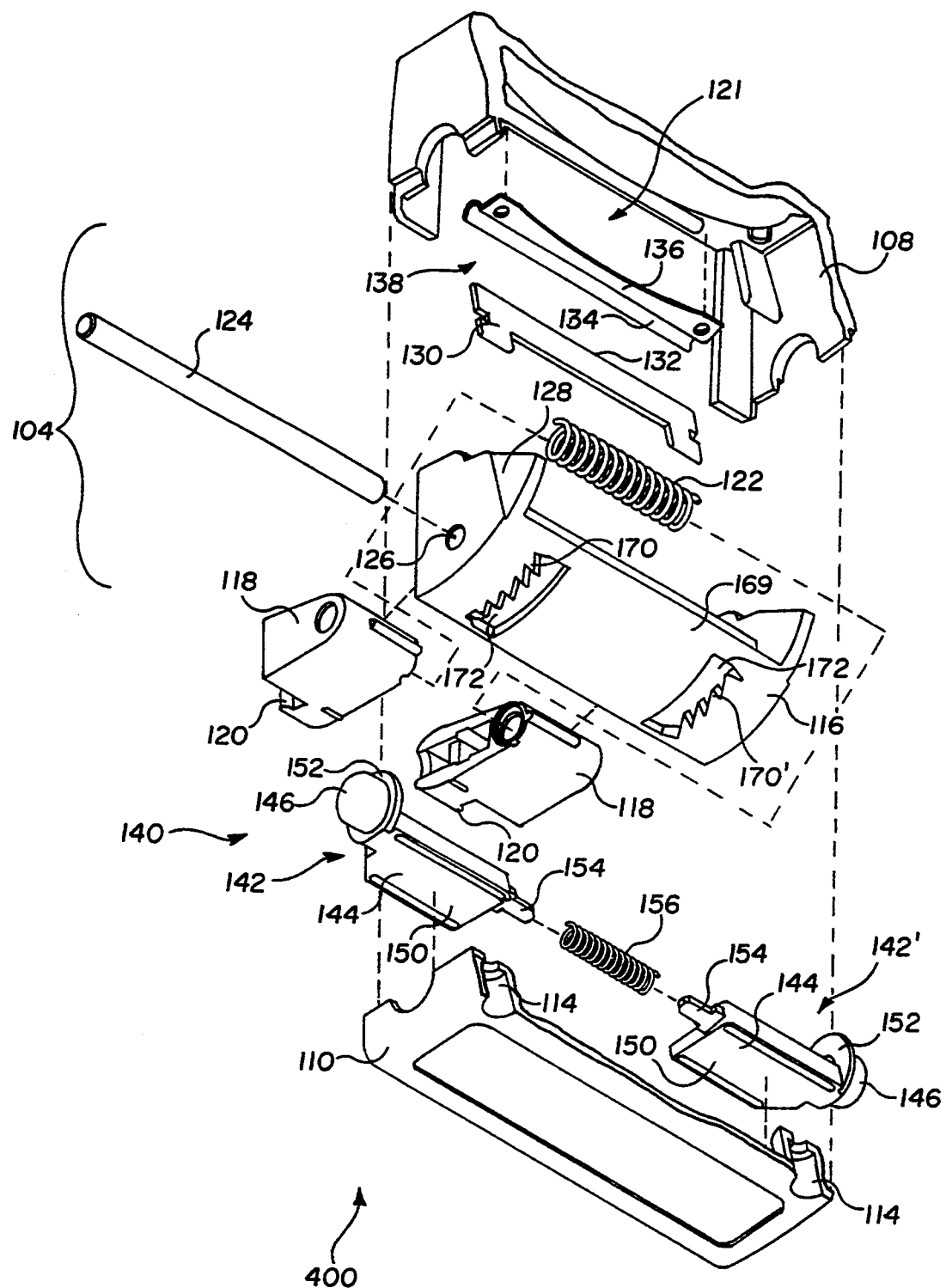
FIG. 4B is an exploded isometric rear view of the third alternative embodiment of FIG. 4A.

A third alternative embodiment of the pointing device 400 is shown in FIGS. 4A and 4B using a ratchet adjustment mechanism. In this embodiment, the fixing members 170 and 170' within the recesses 172 in the curved lower side 169 of the coupling frame 116 each comprise a single row of ratchet or sawtooth-type teeth. Unlike the symmetric teeth used in the first two embodiments, these ratchet teeth are asymmetric, having a right triangle-type shape, each row having an opposing orientation from the teeth of the other row. The locking members 148 of the pivot button members 142 and 142' comprise an opposing pawl such that one is angled in a generally forward direction while the other is angled in a generally rearward direction. Each pawl is designed to work with a corresponding one of the ratchet teeth rows.

When the spring 156 biases the pivot button members 142 and 142' laterally outward, the pawls of the locking members 148 are held in locking engagement with the ratchet teeth of the fixing members 170 and 170'. This locks the housing 102 in a desired angular orientation, with rotational movement in one direction restricted by the right pawl and row of ratchet teeth it engages, and rotational movement in the opposite direction restricted by the left pawl and row of ratchet teeth it engages. When the user desires to change the angular orientation of the housing 102, only one or the other of the pivot buttons 146 needs to be depressed, depending on the direction of rotation of the housing desired. By depressing the right pivot button 146, the right pawl disengages from the right ratchet teeth, thereby permitting the housing 102 to be pivoted upwardly. It is noted that the left pawl and the left ratchet teeth slip relative to each other when the housing is pivoted upwardly. When the user releases the right pivot button 146, the housing 102 is locked in the desired angular orientation against further upward rotation by the right pawl again engaging the right ratchet teeth. Rotation downward is prevented by the left pawl engaging the left ratchet teeth.

Similarly, when the user desires to pivot the housing 102 downwardly, the left pivot button 146' is depressed so that the left pawl disengages the left ratchet teeth, thereby permitting the housing 102 to be pivoted downward. It is noted that the right pawl and the right ratchet teeth slip relative to each other when the housing is pivoted downwardly. When the user releases the left pivot button 146', the housing 102 is locked in the desired angular orientation against further downward rotation by the left pawl again engaging the left ratchet teeth. Rotation upward is prevented by the right pawl engaging the right ratchet teeth. If both pivot buttons 146 are depressed, both the left and right pawls are disengaged from their corresponding ratchet teeth which allows free rotation of the housing 102 both up or down.

The pointing device 400 of FIGS. 4A and 4B permits unidirectional angular movement of the housing 102 when only one of the pivot buttons 146 is depressed, but bidirectional movement when both pivot buttons are depressed simultaneously. Those skilled in the art appreciate that additional pawl teeth may be added to improve the strength of the mechanism for static position retention.

The pointing device 100 is shown fully assembled in various angular orientations in FIGS. 5A, 5B, 6A, and 6B. As shown in these figures, the housing 102 has a slightly arcuate shape, curving upwardly and away from the work surface. Consequently, when pointing device 100 is in its 0° tilt position, it is still angled toward the computer to which it is attached and away from the work surface. This tends to bring the ball 106 closer to keys 549 of the computer. As the pointing device 100 is rotated upwards to the full 30° position, the body 106 is oriented 60° from the work surface, which brings ball 106 quite close to the keys 549 of the computer keyboard (shown in FIG. 6B). Thus, the combination of the upwardly curving body 106 combined with the joint assembly 138 positioned near the top front edge of the pointing device 100 positions the ball 106 closer to the keys, and thus closer to a user's hands on the keys than prior art pointing devices.

The combination of the curved housing 102 and the position of the joint assembly 138 also permits users with various sized hands to use the pointing device 100. For example, a user with large hands would rotate the pointing device 100 to its more vertical orientation (FIGS. 6A and 6B), while a user with smaller hands would orient the pointing device 100 to the more horizontal position, a position more parallel to the work surface (FIGS. 5A and 5B).

The lower surface of the lower housing 110 has a convex pad 545, preferably composed of rubber, or other similar non-slip material. A connecting cord 547, for connecting the pointing device 100 to a computer or other device, protrudes from the pad 545. The pad is comprised of a material more resilient than that of housing 102. The non-slip resilient material provides the user with a more positive grip on the pointing device 100.

Based on the above disclosure, those skilled in the art will recognize that the present invention places the pivot axis proximate to the computer to which the pointing device is attached. Additionally, those skilled in the art will recognize that the present invention employs less components than similar prior art devices. Moreover, the present invention provides a more compact pointing device than those currently available.

Although specific embodiments of the invention have been described for purposes of illustration, various modifications may be made without departing from the spirit and scope of the invention, as is known by those skilled in the art. Accordingly, the invention is not limited by the disclosure, but instead its scope is to be determined entirely by reference to the following claims.

I claim:

1. A computer command apparatus for entering commands into a computer comprising:
   a housing;
   an input device supported by the housing and including a rotatable ball and encoding members adapted to generate electrical signals translatable into commands to the computer;
   a coupling member attachable to the computer;
   a pivot assembly, pivotally coupling the housing and the coupling member together for selected pivoting movement of the housing relative to the coupling member, the pivot assembly including a first hinge member positioned within the housing and attached to the coupling member and a second hinge member positioned within the housing and attached to the housing, the second hinge member being rotatable relative to the first hinge member about a fixed axis of rotation located within the housing to allow selective movement of the housing between a plurality of possible user-selected angular orientations of the housing relative to the coupling member, one of the first or second hinge member having an engagement edge and the other of the first or second hinge member having an elongated receiving recess which pivotally receives the engagement edge therewithin; and
   a locking member selectively, single-handedly operable by a user to lock the housing in the angular orientation relative to the coupling member selected by the user from the plurality of possible angular orientations, and to unlock the housing and allow adjusting angular movement of the housing by the user.

2. The computer command apparatus according to claim 1 wherein the locking member includes an engagement member and the coupling member includes a receiver, and the engagement member is moveable into and out of locking engagement with the receiver to selectively lock and unlock, respectively, the housing against pivotal movement relative to the coupling member.

3. The computer command apparatus according to claim 2 wherein the engagement member is slidably disposed within the housing for reciprocal movement along a path generally transverse to the housing between a laterally inward position whereat the engagement member is out of locking engagement with the receiver and a laterally outward position whereat the engagement member is in locking engagement with the receiver, and the engagement member has a user operable portion moveable by the user to move the engagement member to the laterally inward position.

4. The computer command apparatus according to claim 1 wherein the locking member includes a friction brake movable into and out of frictional engagement with the coupling member to selectively lock and unlock, respectively, the housing against pivotal movement relative to the coupling member.

5. The computer command apparatus according to claim 4, further including an actuator slidably disposed within the housing for reciprocal movement along a path generally transverse to the housing between a laterally inward position whereat the actuator allows the friction brake to disengage from the coupling member and a laterally outward position whereat the actuator forces the fiction brake into frictional engagement with the coupling member, and the actuator has a user operable portion movable by the user to move the actuator to the laterally inward position.

6. The computer command apparatus according to claim 5 wherein the actuator is a cam member which engages and progressively presses the friction brake against the coupling member as the actuator is moved toward the laterally outward position.

7. The computer command apparatus according to claim 1 wherein the locking member includes a pawl and the coupling member includes a set of ratchet teeth, the pawl being engagable with the set of ratchet teeth to permit adjusting angular movement of the housing in a first direction and prevent angular movement of the housing in a second direction opposite the first direction, the pawl being selectively movable into and out of operable engagement with the set of ratchet teeth.

8. The computer command apparatus according to claim 1 wherein the locking member includes a first and second pawls and the coupling member includes first and second sets of ratchet teeth, the first pawl being engagable with the first set of ratchet teeth to permit adjusting angular movement of the housing in a first direction and prevent adjusting angular movement of the housing in a second direction opposite the first direction, and the second pawl being engagable with the second set of ratchet teeth to permit adjusting angular movement of the housing in the second direction and prevent adjusting angular movement of the housing in the first direction, the first pawl being selectively movable into and out of operable engagement with the first set of ratchet teeth and the second pawl being selectively into and out of operative engagement with the second set of ratchet teeth, the first and second pawls being independently movable by a user relative to the other to permit the user to move a selected one of the first and second pawls out of operable engagement with the corresponding one of the first and second sets of ratchet teeth.

9. A computer command apparatus for entering commands into a computer resting on a work surface, comprising:
  a housing;
  an input device supported by the housing and including a rotatable ball and encoding members adapted to generate electrical signals translatable into commands to the computer;
  a coupling member selectively, mechanically attachable to and detachable from the computer;
  a pivot assembly, pivotally coupling the housing and the coupling member together for selected pivoting movement of the housing relative to the coupling member, the pivot assembly including a first hinge member positioned within the housing and attached to the coupling member and a second hinge member positioned within the housing and attached to the housing, the second hinge member being rotatable relative to the first hinge member about a fixed axis of rotation located within the housing to allow selective movement of the housing between a plurality of possible user-selected angular orientations of the housing relative to the coupling member; and
  a locking member selectively, single-handedly operable by a user to lock the housing in the angular orientation relative to the coupling member selected by the user from the plurality of possible angular orientations, and to unlock the housing and allow adjusting angular movement of the housing by the user.

10. The computer command apparatus according to claim 9 wherein the pivot assembly first hinge member has an engagement edge and the second hinge member has an elongated, receiving recess, the engagement edge of the first hinge member being pivotally received within the receiving recess of the second hinge member.

11. A computer command apparatus according to claim 10 wherein the second hinge member extends over and rests upon the first hinge member, and the first hinge member supports a substantial portion of the weight of the housing through the second hinge member.

12. The computer apparatus according to claim 11 wherein the housing includes a retainer member which prevents upward movement of the second hinge member away from the first hinge member as the housing is moved between the plurality of possible angular orientations relative to the coupling member to retain the engagement edge of the first hinge member within the receiving recess of the second hinge member during adjusting angular movement of the housing by the user.

13. The computer command apparatus according to claim 9 wherein one of the first or second hinge member has an engagement edge and the other of the first or second hinge member has an elongated receiving recess which pivotally receives the engagement edge therewithin.

14. The computer command apparatus according to claim 9 wherein the locking member includes an engagement member and the coupling member includes a receiver, and the engagement member is moveable into and out of locking engagement with the receiver to selectively lock and unlock, respectively, the housing against pivotal movement relative to the coupling member.

15. A computer command apparatus according to claim 14 wherein the engagement member includes at least one tooth and the receiver includes at least one row of corresponding teeth engagable by the engagement member tooth at selected locations along the row of teeth.

16. The computer command apparatus according to claim 14 wherein the engagement member is slidably disposed within the housing for reciprocal movement along a path generally transverse to the housing between a laterally inward position whereat the engagement member is out of locking engagement with the receiver and a laterally outward position whereat the engagement member is in locking engagement with the receiver, and the engagement member has a user operable portion moveable by the user to move the engagement member to the laterally inward position.

17. The computer command apparatus according to claim 16, further including a resilient member which engages and moves the engagement member to the laterally outward position when the user releases the user operable portion.

18. The computer command apparatus according to claim 9 wherein the locking member includes a friction brake movable into and out of frictional engagement with the coupling member to selectively lock and unlock, respectively, the housing against pivotal movement relative to the coupling member.

19. The computer command apparatus according to claim 18, further including an actuator slidably disposed within the housing for reciprocal movement along a path generally transverse to the housing between a laterally inward position whereat the actuator allows the friction brake to disengage from the coupling member and a laterally inward position whereat the actuator forces the friction brake into frictional engagement with the coupling member, and the actuator has a user operable portion movable by the user to move the actuator to the laterally inward position.

20. The computer command apparatus according to claim 19 wherein the actuator is a cam member which engages and progressively presses the friction brake against the coupling member as the actuator is moved toward the laterally outward position.

21. The computer command apparatus according to claim 19, further including a resilient member which engages and moves the actuator to the laterally outward position when the user releases the user operable portion.

22. The computer command apparatus according to claim 9 wherein the locking member includes first and second pawls and the coupling member includes first and second sets of ratchet teeth, the first pawl being engagable with the first set of ratchet teeth to permit adjusting angular movement of the housing in a first direction and prevent adjusting angular movement of the housing in a second direction opposite the first direction, and the second pawl being engagable with the second set of ratchet teeth to permit adjusting angular movement of the housing in the second direction and prevent adjusting angular movement of the housing in the first direction, the first pawl being selectively movable into and out of operable engagement with the first set of ratchet teeth and the second pawl being selectively movable into and out of operative engagement with the second set of ratchet teeth, the first and second pawls being independently movable by a user relative to the other to permit the user to move a selected one of the first and second pawls out of operable engagement with the corresponding one of the first and second sets of ratchet teeth.

23. The computer command apparatus according to claim 22, further including first and second actuators slidably disposed within the housing for independent reciprocal movement along a path generally transverse to the housing between a laterally inward position and a laterally outward position, the first actuator moving the first pawl out of operable engagement with the first set of ratchet teeth when in the laterally inward position and into operable engagement with the first set of ratchet teeth when in the laterally outward position, and the second actuator moving the second pawl out of operable engagement with the second set of ratchet teeth when in the laterally inward position and into operable engagement with the second set of ratchet teeth when in the laterally outward position.

24. The computer command apparatus according to claim 23 wherein each of the first and second actuators has a user operable portion movable by the user to independently and selectively move the first and second actuators to the laterally inward position.

25. The computer command apparatus according to claim 24, further including a resilient member which engages the first and second actuators and moves the first and second actuators to their laterally outward positions when the user releases the user operable portion.

26. The computer command apparatus according to claim 9 wherein the locking member includes a pawl and the coupling member includes a set of ratchet teeth, the pawl being engagable with the set of ratchet teeth to permit adjusting angular movement of the housing in a first direction and prevent adjusting angular movement of the housing in a second direction opposite the first: direction, the pawl being selectively movable into and out of operable engagement with the set of ratchet teeth.

27. The computer command apparatus according to claim 9 wherein the first hinge member is a component separate from the coupling member and the second hinge member is a component separate from the housing.

28. The computer command apparatus according to claim 9 wherein the first and second hinge members are positioned within a forward and upper end of the housing, and wherein the coupling member extends from the forward end of the housing, such that the axis of rotation is located within the forward and upper end of the housing.

29. The computer command apparatus according to claim 9 wherein the housing has an elongated arcuate shape curving upwardly from the coupling member and away from the work surface.

30. The computer command apparatus according to claim 9 wherein the housing has a pad, positioned on a lower surface of the housing, the pad comprised of a material more resilient than a material of which the housing is comprised.

31. A computer command apparatus for entering commands into a computer comprising:
   a housing;
   pointing device means, including a rotatable ball and encoding means, supported by the housing, for generating electrical signals translatable into commands to the computer;
   coupling means attached to the computer;
   pivot means for pivotally coupling the housing and the coupling means together and for permitting selected pivoting movement of the housing relative to the coupling means about a fixed axis of rotation located within the housing to allow selective movement of the housing between a plurality of possible user-selected angular orientations of the housing relative to the coupling means; and
   selectively operable locking means for permitting a user to selectively, single-handedly lock the housing in the angular orientation relative to the coupling means selected by the user from the plurality of possible angular orientations, and to unlock the housing and allow adjusting angular movement of the housing by the user.

32. The computer command apparatus according to claim 31 wherein the coupling means includes receiving means, and the locking means includes engagement means for selectively engaging the receiving means and thereby selectively locking and unlocking the housing against pivotal movement relative to the coupling means.

33. The computer command apparatus according to claim 32 wherein the locking means includes user-operable actuation means for actuating one of the engagement means and receiving means, to permit a user to selectively lock and unlock the housing against pivotal movement relative to the coupling means.

34. The computer command apparatus according to claim 31 wherein the locking means includes friction means for selectively, frictionally locking and unlocking the housing against pivotal movement relative to the coupling means.

35. The computer command apparatus according to claim 34 wherein the locking means includes user-operable actuation means for actuating the friction means, to permit a user to selectively lock and unlock the housing against pivotal movement relative to the coupling means.

36. The computer command apparatus according to claim 31 wherein the locking means includes pawl and ratchet means for permitting adjusting angular movement of the housing in a first direction and prevent adjusting angular movement of the housing in a second direction opposite the first direction.

37. The computer command apparatus according to claim 36 wherein the locking means includes user-operable actuation means for actuating the pawl and ratchet means, to permit a user to selectively lock and unlock the housing against pivotal movement relative to the coupling means.

38. A peripheral device for a computer comprising:
a housing;
communication means supported by the housing adapted for communication with the computer;
coupling means attached to the computer;
pivot means for pivotally coupling the housing and the coupling means together and for permitting selected pivoting movement of the housing relative to the coupling means about a fixed axis of rotation located within the housing to allow selective movement of the housing between a plurality of possible user-selected angular orientations of the housing relative to the coupling means; and
selectively operable locking means for permitting a user to selectively, single-handedly lock the housing in the angular orientation relative to the coupling means selected by the user from the plurality of possible angular orientations, and to unlock the housing and to allow adjusting angular movement of the housing by the user.

39. The peripheral device according to claim 38 wherein the coupling means includes receiving means, and the locking means includes engagement means for selectively engaging the receiving means and thereby selectively locking and unlocking the housing against pivotal movement relative to the coupling means.

40. The peripheral-device according to claim 38 wherein the locking means include friction means for selectively, frictionally locking and unlocking the housing against pivotal movement relative to the coupling means.

41. The peripheral device according to claim 38 wherein the locking means includes pawl and ratchet means for permitting adjusting angular movement of the housing in a first direction and preventing adjusting angular movement of the housing in a second direction opposite the first direction.

* * * * *

UNITED STATES PATENT AND TRADEMARK OFFICE
CERTIFICATE OF CORRECTION

PATENT NO. : 5,402,150

DATED : March 28, 1995

INVENTOR(S) : William P. Stiles

It is certified that error appears in the above-identified patent and that said Letters Patent is hereby corrected as shown below:

On the title page, item [73] Assignee: please change the name of the Assignee from "Stratos Product Development Group, Inc., Seattle, Wash." to --Microsoft Corporation, Redmond, Washington--

Signed and Sealed this

Fifth Day of September, 1995

Attest:

BRUCE LEHMAN

Attesting Officer

Commissioner of Patents and Trademarks